(12) United States Patent
Chin et al.

(10) Patent No.: US 9,116,886 B2
(45) Date of Patent: Aug. 25, 2015

(54) DOCUMENT TRANSLATION INCLUDING PRE-DEFINED TERM TRANSLATOR AND TRANSLATION MODEL

(75) Inventors: Jeffrey Jar-hou Chin, Medina, WA (US); Daisy Stanton, San Francisco, CA (US); Vijay Sainath Thadkal, Sunnyvale, CA (US); Jun Yin, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 333 days.

(21) Appl. No.: 13/555,405

(22) Filed: Jul. 23, 2012

(65) Prior Publication Data

US 2015/0161113 A1 Jun. 11, 2015

(51) Int. Cl.
*G06F 17/28* (2006.01)

(52) U.S. Cl.
CPC .................................. *G06F 17/289* (2013.01)

(58) Field of Classification Search
CPC .............. G06F 17/289; G06F 17/2836; G06F 17/2854; G06F 17/2809; G06F 17/2827
USPC ............................................................ 704/2
See application file for complete search history.

(56) References Cited

U.S. PATENT DOCUMENTS

| | | | |
|---|---|---|---|
| 6,339,754 B1 * | 1/2002 | Flanagan et al. | 704/2 |
| 6,470,306 B1 * | 10/2002 | Pringle et al. | 704/3 |
| 6,993,471 B1 * | 1/2006 | Flanagan et al. | 704/2 |
| 6,993,473 B2 * | 1/2006 | Cartus | 704/2 |
| 7,353,165 B2 * | 4/2008 | Zhou et al. | 704/5 |
| 7,493,322 B2 * | 2/2009 | Franciosa et al. | 1/1 |
| 7,512,532 B2 * | 3/2009 | Kimpara | 704/3 |
| 7,680,867 B2 * | 3/2010 | Green et al. | 707/811 |
| 7,865,358 B2 * | 1/2011 | Green et al. | 704/10 |
| 8,145,472 B2 * | 3/2012 | Shore et al. | 704/2 |
| 8,396,859 B2 * | 3/2013 | Green et al. | 707/713 |
| 8,683,329 B2 * | 3/2014 | Tang et al. | 715/265 |
| 8,935,148 B2 * | 1/2015 | Christ | 704/2 |
| 2001/0029455 A1 * | 10/2001 | Chin et al. | 704/277 |
| 2008/0015842 A1 * | 1/2008 | Moore | 704/4 |
| 2008/0262828 A1 * | 10/2008 | Och et al. | 704/3 |

* cited by examiner

*Primary Examiner* — Michael N Opsasnick
(74) *Attorney, Agent, or Firm* — Remarck Law Group PLC

(57) ABSTRACT

A computer-implemented method includes receiving, at a translation server in communication with a network, a request for a translation of text in a source language to a target language. At least a portion of the text is translated at the translation server from the source language to the target language to obtain a translated version of the text in the target language. Translating the text includes determining one or more terms from the text corresponding to a pre-defined term translator, applying the pre-defined term translator to the one or more terms, and translating a set of additional terms from the text from the source language to the target language via a translation model. The method additionally includes providing, via the translation server, the translated version of the text to a web server.

20 Claims, 3 Drawing Sheets

DOCUMENT TRANSLATION INCLUDING PRE-DEFINED TERM TRANSLATOR AND TRANSLATION MODEL

FIELD

The present disclosure relates to document translation.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Translation of text from a source language to a target language may result in improper meanings of terms in the target language and/or phrases that are difficult to follow due to placement of terms in the phrase. For example, terms in the source language with multiple meanings may have an incorrect meaning applied when translated to the target language. Additionally or alternatively, some words in the source language may not have a direct translation in the target language, resulting in cumbersome phases being included in place of the terms.

SUMMARY

In various embodiments of the present disclosure, a computer-implemented method may include receiving, at a translation server in communication with a network, a request for a translation of text in a source language to a target language. At least a portion of the text may be translated at the translation server from the source language to the target language to obtain a translated version of the text in the target language. Translating the text may include determining a source segment from the text corresponding to a target segment in a phrase table, applying the target segment to create the translated version of the text, determining a source term from the text corresponding to a target term in a glossary, applying the target term to create the translated version of the text with the applying the target segment having priority over the applying the target term, and applying a machine translation to translate the text from the source language to the target language with the applying the target segment and the applying the target term having priority over applying the machine translation. The method may additionally include providing, via the translation server, the translated version of the text to a web server.

In various embodiments of the present disclosure, a computer-implemented method may include receiving, at a translation server in communication with a network, a request for a translation of text in a source language to a target language. At least a portion of the text may be translated at the translation server from the source language to the target language to obtain a translated version of the text in the target language. Translating the text may include determining one or more terms from the text corresponding to a pre-defined term translator, applying the pre-defined term translator to the one or more terms, and translating a set of additional terms from the text from the source language to the target language via a translation model. The method may additionally include providing, via the translation server, the translated version of the text to a web server.

Translating the set of additional terms may include a machine translation of the set of additional terms in the target language. Translating at least a portion of the text may include maintaining the at least one of the one or more terms in the source language. At least one of the one or more terms may include a trade name. The text may include text associated with a web page.

Determining the one or more terms may include determining a segment consisting of the one or more terms and applying the pre-defined term translator to the segment. The method may additionally include determining a word within the text and applying a pre-defined glossary to the word with the word being different from the additional terms. Application of the pre-defined term translator to the segment may take priority over the application of the pre-defined glossary to the word. Translating the set of additional terms may include a machine translation of the set of additional terms and the application of the pre-defined glossary to the word may take priority over the machine translation. The word may include a trade name.

In various embodiments of the present disclosure, a system for generating a modified translation may include a translation request module in a translation server in communication with a network, a translation module in the translation server, and a translation output module in the translation server. The translation request module may receive a request for a translation of text in a source language to a target language. The translation module may translate at least a portion of the text from the source language to the target language to obtain a translated version of the text in the target language. The translation module may include a pre-defined term translator and a translation model. The pre-defined term translator may determine one or more terms from the text having a modified translation and apply the modified translation to the one or more terms. The translation model may translate a set of additional terms from the text from the source language to the target language. The translation output module may provide the translated version of the text to a web server via the network.

The translation model may include a machine translator that creates a machine translation of the set of additional terms in the target language. The pre-defined term translator may maintain at least one of the one or more terms in the source language. The at least one of the one or more terms may include a trade name. The text may include text associated with a web page.

The pre-defined term translator may include a phrase table and determine a segment consisting of the one or more terms that is located in the phrase table and apply a first modified translation from the phrase table to the segment for the translated version of the text. The pre-defined term translator may include a glossary and determine a word within the text that is located in the glossary and apply a second modified translation from the glossary to the word for the translated version of the text. The first modified translation may take priority over the second modified translation. The translation model may include a machine translator that creates a machine translation of the set of additional terms in the target language with the first modified translation and the second modified translation taking priority over the machine translation.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
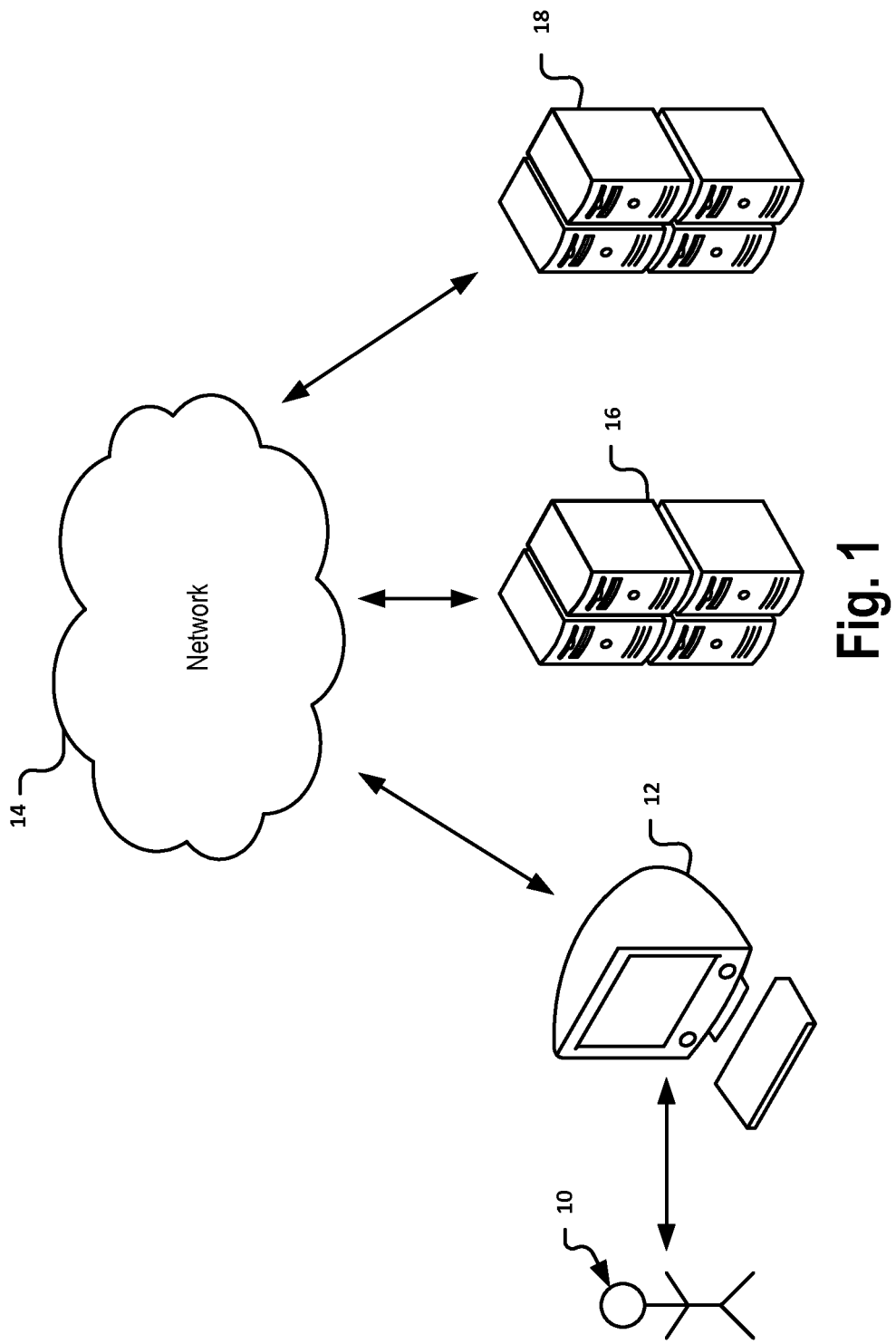
FIG. 1 is a schematic diagram of an example environment in which techniques of the present disclosure can be utilized.

Referring now to FIG. 1, an environment in which the techniques according to some embodiments of the present disclosure can be utilized is illustrated. A user 10 may interact with a user computing device 12, for example, to access a network 14. Examples of the network 14 include, but are not limited to, the Internet, a wide area network, a local area network, and a private network. A web server 16 and a translation server 18 may be connected to the network 14. The web server 16 may be in communication with the translation server 18 via the network 14. The interaction between the user computing device 12 and the web server 16 may be provided by any known technique(s), specifically including, but not limited to, a scripting language interface such as a JavaScript interface. One skilled in the art will appreciate that the environment shown in FIG. 1 is merely illustrative and different environments (such as those that include more or less components, those that include additional connections, and/or those that are arranged in a different configuration) may be utilized with the present disclosure.

Figure 2:
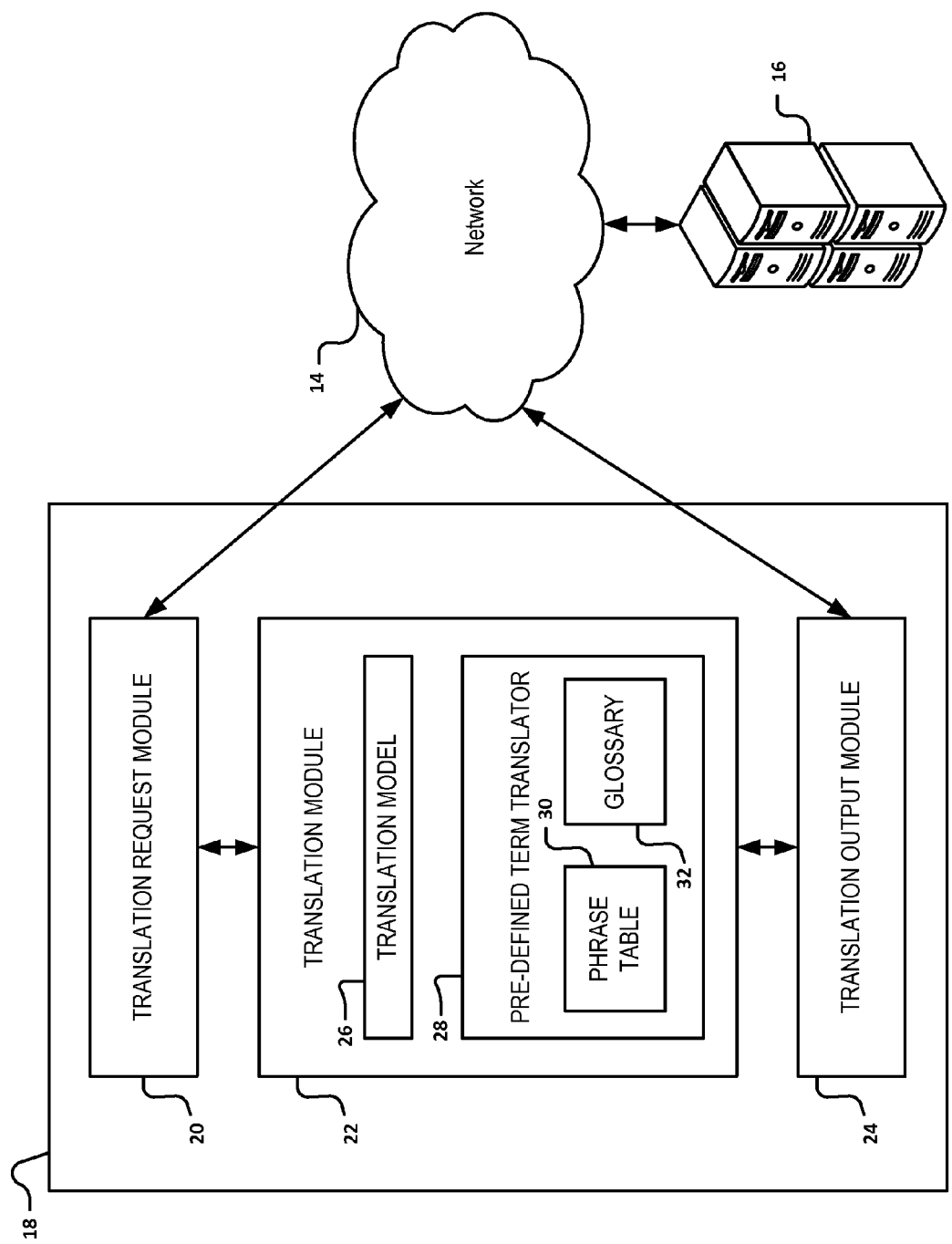
FIG. 2 is a more detailed schematic illustration of the translation server from FIG. 1.

The web server 16 may include source text for a web page and an identifier associated with the text. The source text may be in the form of a text file and may include text associated with the web page. The identifier may be associated with a translation specific to the web page at the translation server 18. With reference to FIG. 2, the translation server 18 may include a translation request module 20, a translation module 22 and a translation output module 24. The translation request module 20 and the translation output module 24 may each be in communication with the web server 16 via the network 14. The translation module 22 may be in communication with the translation request module 20 and the translation output module 24.

The translation module 22 may include a translation model 26 and a pre-defined term translator 28. The translation model 26 may include a machine translator and the pre-defined term translator 28 may include a phrase table 30 and a glossary 32. The phrase table 30 may include a set of pre-defined phrases (segments) formed by one or more terms and the glossary 32 may include individual terms without reference to a complete phrase.

The translation server 18 may include a relation between text in a source language (that is, the original language of the text) such as the source text from the web page and text in a target language (that is, the language which the user 10 desires the text portion to be translated). In the present non-limiting example, the translation model 26 includes a machine translator and the pre-defined term translator 28 includes a predefined translation of the one or more terms from the source language to the target language. The pre-defined term translator 28 may take priority over the translation model 26. The phrase table 30 may take priority over the glossary 32 within the pre-defined term translator 28.

The phrase table 30 may include one or more segments in the source language corresponding to the source text. For example, the phrase table 30 may include a source segment and a corresponding translated segment. The source segment may be the segment from the source text of the web page in the source language. The translated segment may be the translated version of source text in the target language (target segment). The translated segment may be the same as the source phrase (that is, the translation is effectively not translating the segment, but instead maintaining the specific segment in the source language after the translation is performed). Alternatively, the translated segment may include a mix of the target language and the source language. In another alternative example, the translated segment may be completely in the target language. The source segment may include one or more terms. An example source segment including a single term may be a trade name or a heading. An example of a multi-word source segment may include a trade name, a slogan and/or a complete sentence.

The phrase table 30 and the glossary 32 may each be created by a user and associated with a specific identifier. The identifier may be associated with a web page to provide the appropriate translation of the web page and prohibit an unintended translation of the one or more terms.

Figure 3:
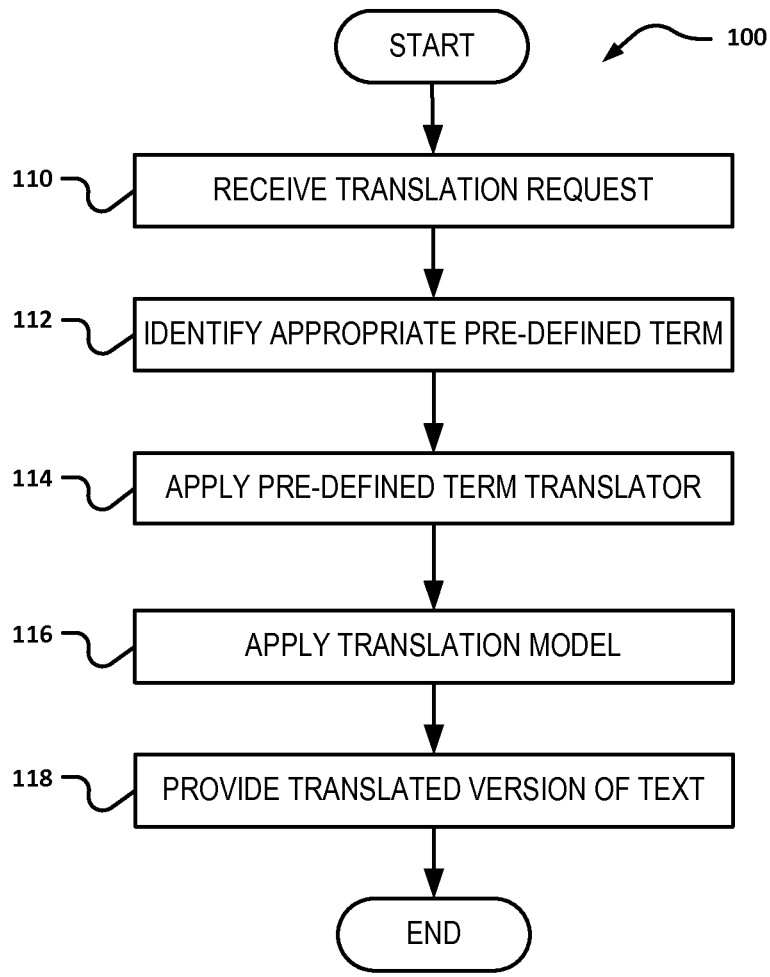
FIG. 3 is a flow diagram of a translation technique according to the present disclosure.

A translation technique 100 according the present disclosure is illustrated in FIG. 3. At 110, a request for a translation of a text in the source language to the target language is received at the translation request module 20. By way of non-limiting example and as noted above, the text may be source text from a web page and the translation request may be initiated by a user selecting a virtual button or link to indicate a desired language for translation. The translation request module 20 may then provide the source text and the identifier to the translation module 22.

At 112, the appropriate pre-defined term translator 28 may be identified based on the identifier from the translation request module 20. At 114, the pre-defined term translator 28 may then determine one or more terms from the text corresponding to the source text and apply the terms to the translation. By way of non-limiting example, application of the pre-defined term translator 114 may include application of the phrase table 30 and the glossary 32. Application of the phrase table 30 may take priority over application of the glossary 32.

At 116, the translation model 26 may be applied to an additional set of terms from the text to translate the additional set of terms from the source language to the target language. The additional set of terms may be different than the one or more terms translated by the pre-defined term translator 28. Application of the translation model 26 may include generating a machine translation of the additional set of terms in the target language. The additional set of terms may include all remaining terms in the text not defined in the phrase table 30 or the glossary 32. Application of the phrase table 30 and the glossary 32 may take priority over application of the translation model 26. At 118, the translated version of the text may be provided to the web server 16 via the translation output module 24 of the translation server 18.

The following non-limiting example is provided for illustration purposes only and is not intended to limit the disclosure in any way. Assume a trucking company named "Bear" has a website. The site may include a series of headings and phrases. For example, the name "Bear" may be included by itself on some portions of the site and may form a trade name. The site may include the text: "Bear can provide all of your trucking needs. Bear can bear the toughest loads." When a user request is received for a translation of the text from the site, the phrase table 30 may be applied first. The phrase table 30 may include the source segment "Bear can bear" and a target segment forming a first modified translation having the first instance of "Bear" remaining in the source language and the terms "can bear" in the target language". The glossary 32 may include the source term "Bear" with a target term "Bear" forming a second modified translation for the remaining instances of "Bear" in the source language. Applying the translation technique 100 would result in the target segment taking priority over the target term and both the target segment and the target term taking priority over the application of a machine translation. In the present non-limiting example, the underlined instances of the term "Bear" would remain in the source language in the text: "Bear can provide all of your trucking needs. Bear can bear the toughest loads", with the remaining portions being translated to the target language.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include: an Application Specific Integrated Circuit (ASIC); an electronic circuit; a combinational logic circuit; a field programmable gate array (FPGA); a processor or a distributed network of processors (shared, dedicated, or grouped) and storage in networked clusters or datacenters that executes code or a process; other suitable components that provide the described functionality; or a combination of some or all of the above, such as in a system-on-chip. The term module may also include memory (shared, dedicated, or grouped) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method comprising:
receiving, at a translation server in communication with a network, a request for a translation of text in a source language to a target language, the request including an identifier associated with (i) a phrase table and (ii) a glossary, the phrase table and glossary both being specific to a user that identified the text for translation;
translating, at the translation server, at least a portion of the text from the source language to the target language to obtain a translated version of the text in the target language, the translating including:
identifying the phrase table and the glossary based on the identifier;
determining a source segment from the text corresponding to a target segment in the identified phrase table;
applying the target segment to create the translated version of the text;
determining a source term from the text corresponding to a target term in the identified glossary;
applying the target term to create the translated version of the text with the applying the target segment having priority over the applying the target term; and
applying a machine translation to translate the text from the source language to the target language with the applying the target segment and the applying the target term having priority over applying the machine translation; and
providing, via the translation server, the translated version of the text to a web server.

2. A computer-implemented method comprising:
receiving, at a translation server in communication with a network, a request for a translation of text in a source language to a target language, the request including an identifier associated with a pre-defined term translator specific to a user that identified the text for translation;
translating, at the translation server, at least a portion of the text from the source language to the target language to obtain a translated version of the text in the target language, the translating including:
identifying the pre-defined term translator based on the identifier;
determining one or more terms from the text corresponding to the identified pre-defined term translator;
applying the pre-defined term translator to the one or more terms; and
translating a set of additional terms from the text from the source language to the target language via a translation model; and
providing, via the translation server, the translated version of the text to a web server.

3. The method of claim 2, wherein the translating the set of additional terms includes a machine translation of the set of additional terms in the target language.

4. The method of claim 2, wherein the translating at least a portion of the text includes maintaining the at least one of the one or more terms in the source language.

5. The method of claim 4, wherein at least one of the one or more terms includes a trade name.

6. The method of claim 2, wherein the text includes text associated with a web page.

7. The method of claim 2, wherein the determining the one or more terms includes determining a segment consisting of the one or more terms and applying the pre-defined term translator to the segment.

8. The method of claim 7, further comprising determining a word within the text and applying a pre-defined glossary to the word with the word being different from the additional terms.

9. The method of claim 8, wherein application of the pre-defined term translator to the segment takes priority over the application of the pre-defined glossary to the word.

10. The method of claim 9, wherein the translating the set of additional terms includes a machine translation of the set of additional terms and the application of the pre-defined glossary to the word takes priority over the machine translation.

11. The method of claim 8, wherein the word includes a trade name.

12. A system for generating a modified translation comprising:
a translation request module in a translation server in communication with a network that receives a request for a translation of text in a source language to a target language, the request including an identifier associated with a pre-defined term translator specific to a user that identified the text for translation;
a translation module in the translation server that translates at least a portion of the text from the source language to the target language to obtain a translated version of the text in the target language, the translation module including:
the pre-defined term translator associated with the identifier that determines one or more terms from the text having a modified translation and applies the modified translation to the one or more terms; and
a translation model that translates a set of additional terms from the text from the source language to the target language; and a translation output module in the translation server that provides the translated version of the text to a web server via the network.

13. The system of claim 12, wherein the translation model includes a machine translator that creates a machine translation of the set of additional terms in the target language.

14. The system of claim 12, wherein the pre-defined term translator maintains at least one of the one or more terms in the source language.

15. The system of claim 14, wherein the at least one of the one or more terms includes a trade name.

16. The system of claim 12, wherein the text includes text associated with a web page.

17. The system of claim 12, wherein the pre-defined term translator includes a phrase table and determines a segment consisting of the one or more terms that is located in the phrase table and applies a first modified translation from the phrase table to the segment for the translated version of the text.

18. The system of claim 17, wherein the pre-defined term translator includes a glossary and determines a word within the text that is located in the glossary and applies a second modified translation from the glossary to the word for the translated version of the text.

19. The system of claim 18, wherein the first modified translation takes priority over the second modified translation.

20. The system of claim 19, wherein the translation model includes a machine translator that creates a machine translation of the set of additional terms in the target language with the first modified translation and the second modified translation taking priority over the machine translation.

* * * * *